United States Patent

[11] 3,607,176

[72] Inventors: Alexandre Milochevitch, Saint Michel sur Orge; Maurice Roulot, Orsay, both of France
[21] Appl. No.: 754,553
[22] Filed: Aug. 22, 1968
[45] Patented: Sept. 21, 1971
[73] Assignee: Compagnie Generale D'Electricite, Paris, France
[32] Priority: Sept. 1, 1967, Sept. 18, 1967
[33] France
[31] 119,720 and 121,387

[54] METHOD OF SEALING METAL IN A VITREOUS ENCLOSURE
9 Claims, 11 Drawing Figs.
[52] U.S. Cl. .................................................. 65/32, 65/54, 65/59
[51] Int. Cl. .................................................. C03c 27/02
[50] Field of Search ........................................... 65/43, 59, 36, 58, 32; 129/121; 29/25.13; 174/50.61; 220/2.1, 2.2, 2.3

[56] References Cited
UNITED STATES PATENTS

| | | | |
|---|---|---|---|
| 2,386,820 | 10/1945 | Spencer .................... | 65/32 |
| 2,813,213 | 11/1957 | Cramer et al. ............ | 65/59 X |
| 3,131,046 | 4/1964 | Dennett et al. ........... | 65/58 |
| 3,304,403 | 2/1967 | Harper ..................... | 219/121 |

Primary Examiner—S. Leon Bashore
Assistant Examiner—Saul R. Friedman
Attorney—Sughrue, Rothwell, Mion, Zinn & Macpeak ABSTRACT: A method of sealing a metallic wire between two vitreous parts. The wire is positioned so that its ends extend outwardly from opposite sides of the enclosure formed by the parts. The adjacent side edges of the parts are formed with protuberent lips which surround the portion of the wire adjacent one end thereof. The parts are preheated, in a controlled atmosphere. A laser beam is then focused on the one end of the wire to fuse it and thereby also fuse, by contact heat transfer, the side portions of the vitreous parts which are adjacent the wire. The wire is thus welded in the enclosure with the fused protuberent lips forming an outwardly extending enclosure portion which reinforces the seal in the area adjacent to the fused wire.

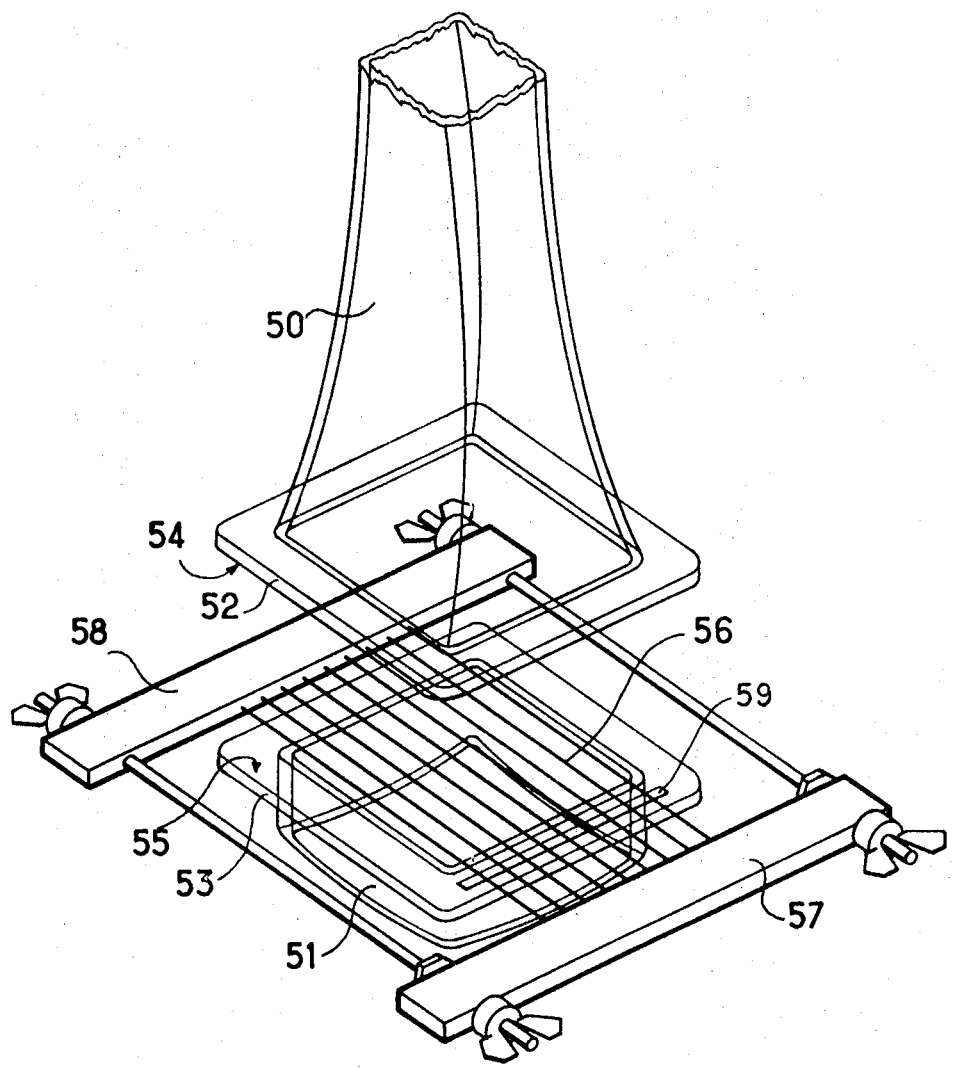

METHOD OF SEALING METAL IN A VITREOUS ENCLOSURE

The present invention concerns methods of welding glass to glass and of welding metal parts to glass or like components and in particular, to welding methods for producing electronic components, such as electron tubes or color television tubes.

It is known to weld quartz to quartz by means of a radiation beam of the laser type without the application of an external agent. However, this method of welding does not permit joining glass to glass or glass to metal, for example, because the action of the laser beam produces thermal stresses which result in the destruction of the material around the weld.

One of the basic objects of the present invention is to obtain, with materials which may exhibit considerable thermal stresses, welds in which the deformation and/or destruction of the structure in the neighborhood of the weld area is minimized.

It is a further object of this invention to obtain clean welds which are uncontaminated and which have the finest possible molten zones, without any excessive heating of the mass of the parts to be welded.

Another object of the present invention is to weld parts which consist of materials which may exhibit thermal stresses and which allows the inner position between these metallic parts which may be detrimentally affected by heat and in which it is essential to limit the deterioration of these parts to a minimum zone in order to leave intact the physical properties of the metal parts lying outside the welding area.

The present invention concerns a welding method which is distinguished by the fact that the welding of the two parts is achieved by a beam of electromagnetic radiation having high energy density and wherein the parts are preheated to a temperature in the neighborhood of the temperature of the pasty state for the vitreous parts being welded, and wherein cooling of the welded parts thereafter is gradually effected.

The present invention also concerns a method of securing filamentary metallic parts to parts consisting of materials, such as glass or the like with the method being distinguished by the fact that one of the filamentary parts is disposed between the glass parts which are thereafter welded by the action of a beam of high density electromagnetic radiation, by localized fusion of the glass or other vitreous parts on one side of the assembly, at the end of the filamentary parts.

Although the invention is applicable to a large number of technical fields, this invention concerns, in particular, the techniques and production of optical products, of gas or vacuum tubes and of tubes generally employed in the electronic industry and in particular to television tubes. The technique of manufacture of television tubes in general gives rise to similar problems to those arising in the production of electronic tubes. However, in the particular case of color television tubes and above all those of the so-called grid type, many problems arise, on one hand in the manufacture of the grid itself and on the other hand, in the positioning of the grids within the picture tube.

The present invention, therefore, has for an additional object the resolving of problems normally experienced in producing the grids and positioning them in color television tubes. This permits the manufacture of grids of types which have not been possible, up to this time, to produce owing to the fact that all of the welding work on the tube resulted in deformations to the grid itself during welding.

The present invention also has for its object to provide a method of coating filamentary members by materials, such as glass or similar products, without deterioration to the ends of the filamentary members. This is applicable, for example, to bushings for electrical leads into enclosed spaces in which there may be present a neutral atmosphere or even a vacuum as in certain electron tubes in the miniaturization field.

For some applications and more particularly for vacuum or glass tubes, electron tubes and television tubes, it may be necessary to pass the metal filament through a glass wall and to weld or seal it therein without damaging the end of the filament which extends out of the tube because this end must also serve as an electrical contact.

The present invention has for an additional object a method for sealing the end of the metal filament which extends from the glass wall to the wall through which it passes, without damaging the extending metal filament end.

Simple preheating prior to welding by means of a furnace does not, in some cases, prevent the formation of cristobalite around the weld. The present invention is also concerned with the improvement in a soldering or welding method by which this disadvantage may be lessened.

Further features and advantages of the present invention will be apparent from the following description with reference to the accompanying drawings, in which:

FIG. 11 is a partial schematic, perspective view of the method of the present invention as applied to the production of a grid-type television tube.

DESCRIPTION OF THE PREFERRED EMBODIMENTS

Figure 1:
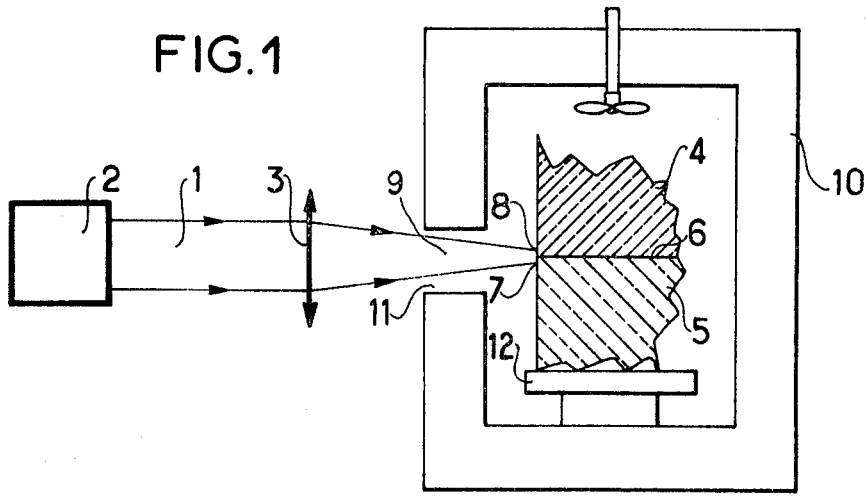
FIG. 1 is a diagrammatic representation of a welding apparatus for carrying out the method of the present invention.

FIG. 1 illustrates the basic principle of the present invention as applied to the welding of two glass plates. The two plates 4 and 5 are disposed, one upon the other, in a furnace 10 and are carried by a support device 12. The furnace 10 may be pressurized by means, not shown, with an oxidizing reducing or neutral atmosphere, for example, with a gas, such as argon. The furnace may also be pressurized by oxygen to produce welds covered by a surface oxide layer which will subsequently perform a protective function.

The furnace 10 further comprises a window 11 through which there is passed a beam of intense electromagnetic radiation, for instance, a laser beam 1, emitted by a laser device 2, which, for instance, may be a $CO_2$ laser of sufficiently high power, for example, on the order of 100 to 150 watts. The laser beam 1 preferably passes through a focusing device 3 and the convergent portion 9 of the beam is directed toward the lips 7 and 8 of glass members 4 and 5 on opposite sides of the line of abutting contact 6 between these parts. The focusing device 3 may be of any type, for example, a concave mirror, or it may be a lens made of a material which is transparent to the laser beam, this material being, for example, sodium chloride in the case of a carbon dioxide laser. The support device 12 permits the line of contact 8 formed by the two lips 7 and 8 to move through the light beam and particularly portion 9 thereof at a constant speed, which, by way of indication, may be of 1 or 2 mm., per second. The spot of the convergent beam 9 on the two lips 7 and 8 must be equally distributed over the two lips, on either side of the line of separation 6 between parts 4 and 5.

It is obvious that the distance between the focusing device and the lips 7 and 8 depends upon a number of factors, such as, for example, the available power of the laser and the size of the molten zone which is desired.

Throughout the operation, the furnace 10 is maintained at constant temperature. This temperature is preferably slightly below the temperature of the pasty state of the parts to be welded. In the case of glass parts 4 and 5, whose melting point is in the neighborhood of 500° C., the temperature of the furnace 10 will preferably be about 450° C. When all of the desired welds have been made, the welded parts are subjected to slow cooling which may be carried out, for example, by gradually lowering the temperature of the furnace to the ambient temperature over a period which must be experimentally determined and which depends upon the nature of the materials employed. For example, in the case of glass parts 4 and 5 having a melting point 500° C., the cooling period will be about 20 hours.

As mentioned previously, one of the primary objects of the present invention is to fixedly position, by welding, metal parts to parts consisting of glass or like material, and in particular, to fixedly position, by welding, filamentary parts to glass parts.

Figure 2:
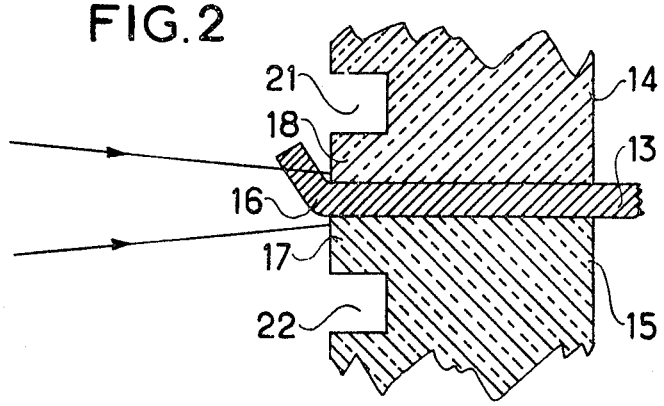
FIG. 2 is a sectional view of the junction portions of two vitreous parts which are to be welded together and about a metal member positioned therebetween.
Figure 3:
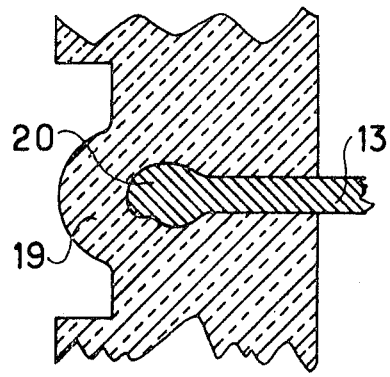
FIG. 3 is a sectional view of the parts of FIG. 2 after welding.

In accordance with the invention, one or more metal filaments may be welded within glass, as illustrated in FIG. 2. For this purpose, it is sufficient to maintain the metal filament 13 positioned between two glass plates 14 and 15 and to weld the three parts in a single operation, with the aid of a beam of electromagnetic radiation by the method described with respect to the apparatus of FIG. 1. Since the energy supplied by this radiation is considerable, one part 16 of the metal filament, which is in the direct path of the laser beam, is melted at the same time as are portions 17 and 18 of the abutting glass plates 14 and 15. As seen in FIG. 3, the filament 13 is held fast in the formed part 19 which is common to the two plates 14 and 15 with a small metal beam 20 having been formed under the very localized intense heat created by the high energy electromagnetic radiation.

In order that the parts may not be deformed over too large a surface, there may be advantageously provided, as illustrated in FIG. 2, two grooves 21 and 22 which are parallel to the line of contact between the plates 14 and 15, which grooves may have, for example, a square cross section, the size of which being 4 to 5 mm., and the distance from the line of contact of the glass members with the metallic filament also being on the order of 5 mm.

Figure 4:
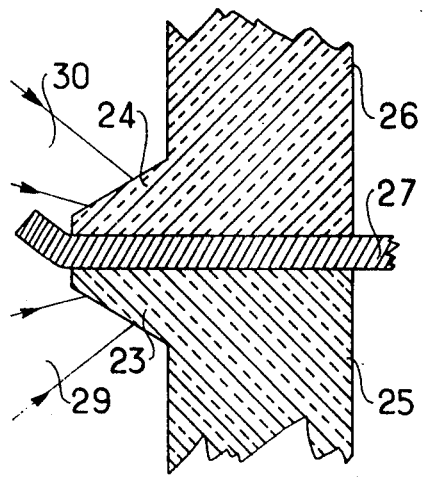
FIG. 4 is a sectional view of junction portions of two vitreous parts of particular configuration which are to be welded together and to a metal member positioned therebetween under the method of the present invention.

FIG. 4 is an illustration of another embodiment of the present invention in which there is employed the energy of two beams, 29 and 30, which may emanate from the same laser after deflection by a system of semitransparent and reflecting plates (not shown), the beams 29 and 30 being focused on tapered, projecting bosses 23 and 24 which are machined in the vitreous blocks 25 and 26. With the metal filamentary material 27 positioned between these blocks as a result of laser beam welding under the techniques of the present invention, the filament 27 is anchored in the common mass 28 of vitreous material formed by fusion of the blocks 25 and 26.

Figure 6:
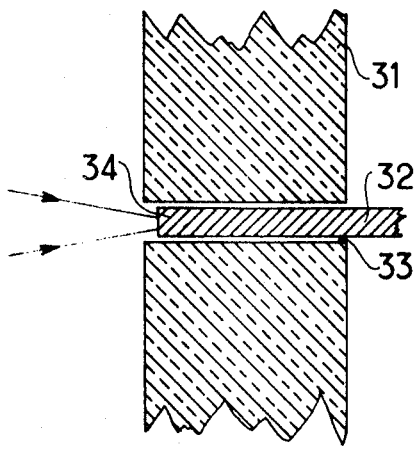
FIG. 6 is a sectional view of two vitreous parts which are to be welded together and to an interpositioned metal member which is spaced slightly therefrom prior to welding.
Figure 7:
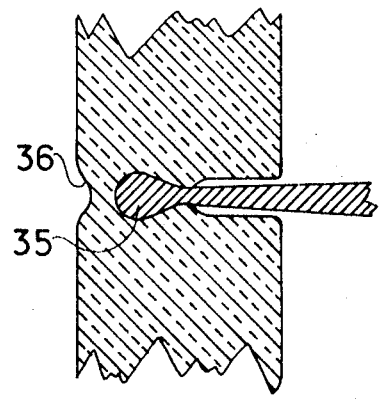
FIG. 7 is a sectional view of the parts shown in FIG. 6 subsequent to welding under the method of the present invention.

Another variant of the present invention is illustrated in FIG. 6 in which a metal filament 32 may be welded within a glass mass 31 by drilling, in the latter, a hole 33 of a diameter slightly larger than that of the filament and inserting the filament or wire into the hole. The welding of the filament thus positioned takes place in the same way as wherein the filament is disposed between two separate vitreous parts. FIG. 7 illustrates the structure subsequent to welding, in which an enlarged head 35 of metal securely locks the metal filament within the fused vitreous block 31 with a slight depression 36 being formed in the surface of the fused block facing the laser beam.

It is thus possible to weld a whole series of metal filaments, side by side, in the same way as glass by moving the same past a laser beam and welding each filament to the glass at those points along the path of travel at which the welds must be made.

Figure 8:
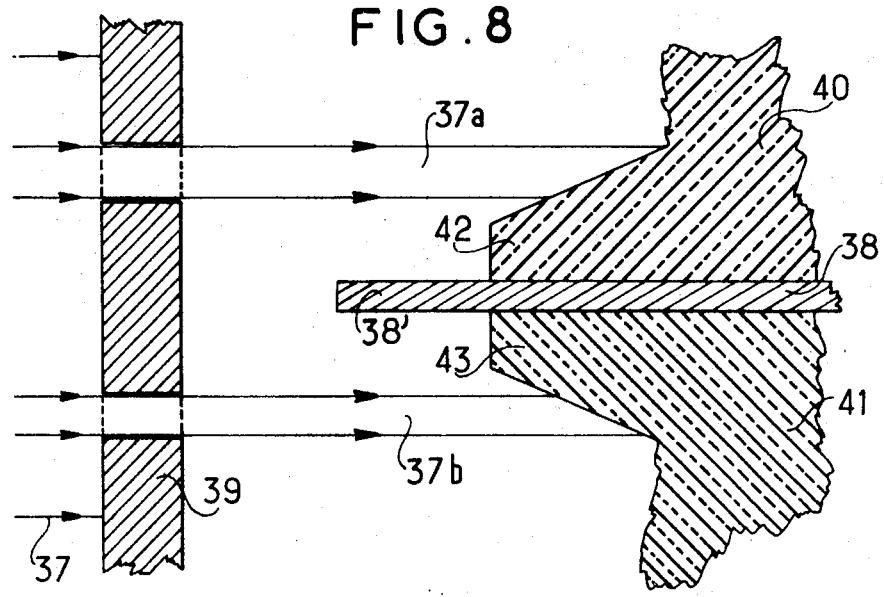
FIG. 8 is a partial schematic, sectional view of two vitreous parts to be welded together and to an interpositioned metallic member in filamentary form by paired laser beams under the method of the present invention.

FIG. 8, in section, illustrates two members of glass or like material which are to be welded together and through which there extends a metal filament whose outer end is to be protected. In a variant to the method of the present invention, a conical or cylindrical laser beam 37 impinges upon an optical device 39 which allows the passage of only a beam portion which acts on the lips or bosses 42 and 43 of respective vitreous members 40 and 41, whereby welding is achieved without the beam touching the central portion of the assembly from which emerges end 38' of metal filament 38. The optical device 39 may be, for example, a screen of graphite or other refractory material which is opaque to the laser radiation employed or any optical device which may comprise passive elements (prisms, lenses, etc.), or active elements (optical devices whose beam divergence may be controllable). The issuing beams or beam components 37a, 37b may be in the form of a tube which is substantially concentric with the end 38' of the filament 38. The issuing beams or beam components 37a, 37b may also be in the form of two plane or substantially plane sheets which are symmetrical about the filament 38. These sheets or a single tubular beam may be parallel or convergent, this depending essentially upon the shape of the lips or bosses 42 and 43, and also upon the type of optical device 39. The applied laser beam fuses only a portion of the boss forming lips 42 and 43 and in such a manner that the temperature gradient at the level of the filament 38 is just sufficient to effect a surface fusion of the filament, or in fact, may even avoid any fusion of this filament.

Figure 5:
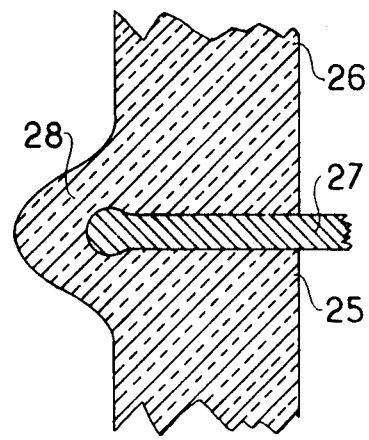
FIG. 5 is a sectional view of these parts after welding.
Figure 9:
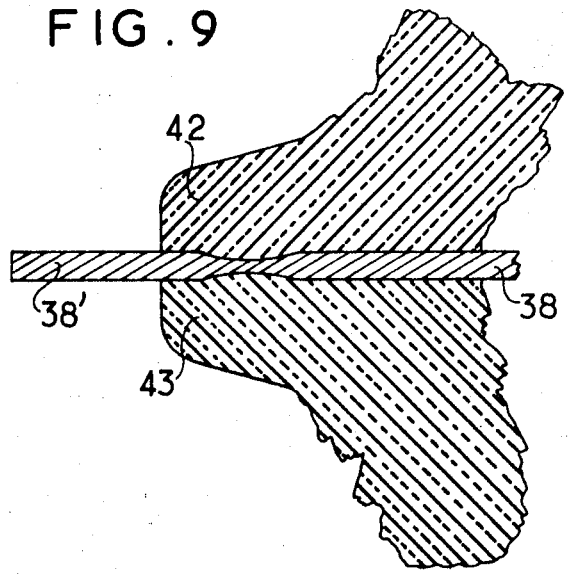
FIG. 9 is a schematic view of the parts shown in FIG. 8 subsequent to welding.

The result obtained under the method of the present invention is illustrated in FIG. 9, in which the filament is shown as embedded in the vitreous mass formed by members 40 and 41. It is also possible to employ two focused or nonfocused independent beams impinging upon the bosses 42 and 43, the difference from the result illustrated in FIG. 5 residing in the fact that the energy of the beams is so controlled as to avoid destruction of the end of the filament. The filament tip 38, therefore, forms an electrical contact.

Figure 10:
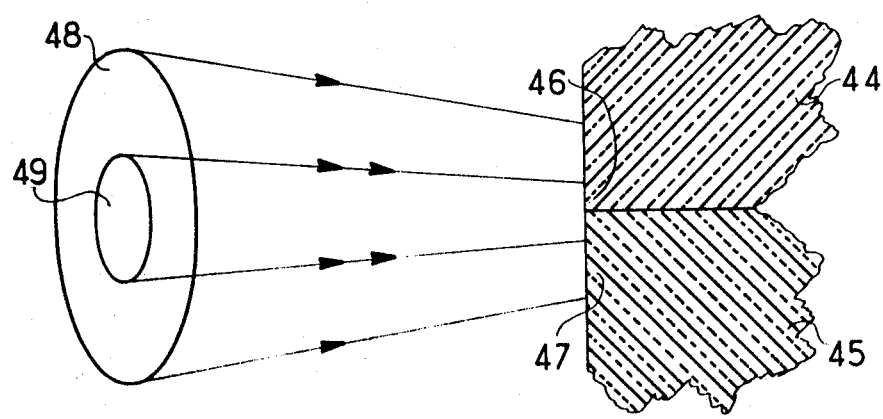
FIG. 10 is a partial schematic and sectional view of abutting vitreous parts to be welded by two or more separate beams under the principles of the present invention.

In accordance with another aspect of the present invention, the preheating of the glass members to be welded is effected not only by a furnace of the conventional type, but in addition, with a preferably coherent electromagnetic radiation beam of high energy density. This arrangement is of outstanding interest by virtue of the fact that simple preheating is not sufficient in all cases to eliminate local deformations and more particularly, the formation of cristobalite in the region in the neighborhood of the weld. In accordance with the present invention, the members to be welded are placed in a furnace which brings them to a temperature in the neighborhood of the pasty state of the vitreous materials, for example, 450° C. in the case of glasses of ordinary quality. An electromagnetic beam, for example, a laser beam 48, as indicated in FIG. 10, is directed onto the abutting lips 46 and 47 of vitreous members 44 and 45 which are to be welded together. It is noted that in this case also these lips may have the form of projecting bosses, such as those of several of the embodiments of the preceding figures. The energy of the electromagnetic beam 48 is so adjusted as to raise the temperature of the lips to a value which may be on the order of 550° C. to 600° C., that is, just below the temperature necessary for making an effective weld. At this instant, a second electromagnetic beam 49, preferably focused onto the immediate surface areas at the line of separation of members 44 and 45, and optionally, with a mask for protecting the end of the magnetic filament (not shown) which may be disposed between members 44 and 45, is applied for a relatively short instant which is necessary for completing fusion and effecting a final weld between these members.

It is noted that beams 48 and 49 may emanate from a common source in an optical device similar to that employed in the embodiment of FIG. 8 may be provided to cause the portion of the beam 49 to be applied at a given instant.

On the other hand, it is possible to employ two different sources, for example, a continuously operating laser supplying the beam 48 and a pulse laser or a laser which may be modulated to form welding beam portion 49.

The intensity of the preheating beam 48 may be, for example, progressive. With the aid of known means, for example, a photodetector (not shown) which receives a small portion of the incident beam, the second beam 49 of a much higher intensity, may be activated at the desired instant, the latter providing all the energy necessary for the localized fusion of the materials to be welded at the surface of contact.

For the purpose of welding by beam travel along a line of great length, the auxiliary preheating beam may be slightly offset and spaced from the welding beam so that the material to be locally fused, which is brought opposite the spot of the other beam, is already at a temperature sufficient to effect welding without damage.

In accordance with another embodiment, the same beam may be employed for preheating and for welding with the aid of a lens, of which the focal length and/or the distance from the welding line may be varied such that the surface of impact of the beam is narrowed so as to be concentrated solely on the welding line. It is obvious that the law of variation of the distance is a function of the thermal energy of the materials to be welded.

Turning to FIG. 11, there is illustrated the application of the previously described method to the manufacture of color television tubes of the so-called "grid tube" type.

In accordance with the invention, the television tube is produced in two parts, namely, a rear section 50 and a front section 51. These sections preferably comprise external lips or bosses 52 and 53, or if desired, internal lips or bosses (not shown), may be welded in the same manner. The opposed surfaces 54 and 55 of the respective lips 52 and 53 are machined to be plane and are completely clean prior to welding.

In accordance with a preferred embodiment, the grid is made separately and is, for example, in the form of a series of metal filaments 56 situated in a common plane and exactly parallel. These metal filaments are maintained in position by a frame which is diagrammatically represented by an assembly of parts 57 and 58 which are associated with means for adjusting the tension of the parallel filaments. Preferably, these means are such that the tension of each of the filaments may be independently adjusted, or at least these means are such that the tension of all the filaments is substantially equal. The grid thus produced is disposed between the sections 50 and 51 which are gripped together so as to maintain the filaments securely in position prior to welding. The welding method, according to the invention, is then achieved by disposing the assembly in a furnace which brings the assembly to a temperature in the neighborhood of that of the pasty state of the glass or other vitreous materials of which the sections 50 and 51 are formed. The welding of the lips or bosses 52 and 53 is thereafter effected with the aid of a beam of coherent electromagnetic radiation of high energy density, in the manner described previously with respect to the present invention.

In accordance with one feature of the present invention, the tension of the filaments of the grid may be regulated, adjusted or corrected after the sections have been brought to a temperature in the neighborhood of that of the pasty state of the vitreous parts and just before the welding operation itself, for example, where an auxiliary preheater laser causes the parts to be brought up to the pasty state temperature just before the action of the high intensity laser to weld the same.

More particularly, there may be employed a device which is capable of maintaining the filaments constant until a fraction of the second in which the glass solidifies after the action of the laser beam.

In addition, it is known that the filaments of a color television tube must be electrically connected together. For this purpose, the ends of the filaments of the grid may be connected outside the tube or there may be employed a transverse conductor which is disposed within the tube.

In accordance with one feature of the present invention, the filaments of the grid are connected by disposing a transverse conductor 59 between opposing surfaces 54 and 55, at the level of the glass walls which are to be welded. The pressure exerted on the sections strongly applies this conductor to the filaments of the grid and after welding, this conductor is embedded in the molten glass mass, while one end of the conductor may be brought to a point outside or inside the tube according to the requirements of the system.

In accordance with another feature of this invention, the conductor may be made, with advantage, by metallization of a portion of the surface 55 or 54 or both. During the operation of the welding of the lips of the sections 50 and 51, it is possible in some cases to create a negative pressure within the tube which would have the effect of improving the fluidtight properties of the weld.

In some cases it may be advantageous to place the method of the present invention into practice without welding the filaments, even directly to the sections 50 and 51, by providing a frame which is so constructed as to be nondeformable or substantially nondeformable at the preheating temperature of the assembly and to weld this frame to the abutting lips of sections 50 and 51.

The method of the present invention as applied to the production of color television tubes has an important advantage because it makes possible the maintenance, adjustment or correction to the tension of the filaments of the grid up until the last instant preceding the solidification of the glass members which are welded by the beam of coherent electromagnetic radiation at high energy density. The action of this beam is so rapid that, provided that its intensity is appropriately adjusted and provided that the points of impact are precisely defined, the glass members are welded without any fusion or even considerable heating of the metal filaments. The filaments will, therefore, remain substantially at the same tension, and they will not undergo any appreciable deformation. These advantages are of even greater value when compared with the disadvantages inherent in the known conventional methods. For instance, a method of manufacturing television tubes is known in which the sections 50 and 51 are adhesively bonded together by means of a synthetic thermosetting material. These materials have high thermal inertia to the extent that polymerization is not instantaneous. Consequently, any modification of the tension of the filaments is impossible at the last instant, because a displacement of the filament would prevent its anchoring in a material undergoing polymerization and there would then be no possibility of maintaining a constant tension. Of course, the invention is in no way limited to the embodiments described and illustrated, which have been referred to only by way of example. More particularly, it is possible, without departing from the scope of the invention, to make modifications in detail, to change certain arrangements and/or to replace certain means by equivalent means.

What is claimed is:

1. A method of sealing a metallic wire in an enclosure of vitreous material, comprising the steps of:
    positioning the wire between separated portions of said enclosure so that the ends of said wire extend outwardly from opposite sides of said enclosure;
    forming adjacent side edge portions of said enclosure portions with protuberent lips surrounding the portion of said wire adjacent one end thereof;
    preheating a localized area of said enclosure surrounding said portion of said wire and the enclosure portions to be joined thereto to a temperature slightly lower than the pasty state temperature of said vitreous material in a controlled atmosphere having a gaseous composition that will not react chemically with said wire and said vitreous material, and
    focusing a first laser beam on said one end of said wire to fuse said wire at a point substantially adjacent to said lips, thereby fusing by contact heat transfer the enclosure portions adjacent to the fused portion of said wire to weld said wire to said enclosure, said fused lips forming an outwardly extending enclosure portion serving to reinforce said enclosure in the area thereof adjacent to said fused wire portion.

2. The method of claim 1 wherein said localized preheating is accomplished by a second laser beam of less intensity than said first beam.

3. The method of claim 1 wherein said separated portions of said enclosure are defined by separate pieces of vitreous material.

4. The method of claim 1 wherein said separated portions of said enclosure are defined by the surfaces of said enclosure surrounding an aperture therethrough in which said wire is positioned.

5. The method of claim 1 wherein said first laser beam is focused on said one wire end and on the immediate surrounding portion of the enclosure.

6. The method of claim 1 wherein said wire is fused to a depth within said lips to form a fused portion thereon of greater diameter than the wire diameter, thereby providing a strong mechanical connection between the enclosure and the wire.

7. The method of claim 1 wherein said wire and the surrounding enclosure portions are fused by said first laser beam to form a portion of said wire within said enclosure of a diameter less than that of the other portions of said wire, thereby providing a strong mechanical connection between the enclosure and the wire.

8. The method of claim 1 wherein said vitreous material has a melting point of approximately 500° C. and the localized area of said enclosure is preheated to a temperature of approximately 450° C.

9. The method of claim 1 further comprising the step of slowly cooling the welded wire and enclosure.